United States Patent
Kuwakino et al.

(10) Patent No.: US 7,417,682 B2
(45) Date of Patent: Aug. 26, 2008

(54) VISIBLE AND INFRARED LIGHT PHOTOGRAPHING LENS SYSTEM

(75) Inventors: Koshi Kuwakino, Saitama (JP); Satoshi Yahagi, Saitama (JP); Takami Hasegawa, Yokohama (JP)

(73) Assignee: Fujinon Corporation, Saitama (JP)

( * ) Notice: Subject to any disclaimer, the term of this patent is extended or adjusted under 35 U.S.C. 154(b) by 626 days.

(21) Appl. No.: 10/847,344

(22) Filed: May 18, 2004

(65) Prior Publication Data

US 2005/0012843 A1 Jan. 20, 2005

(30) Foreign Application Priority Data

May 21, 2003 (JP) .............................. 2003-142884
Apr. 30, 2004 (JP) .............................. 2004-135131

(51) Int. Cl.
*G03B 13/00* (2006.01)

(52) U.S. Cl. ...................... 348/345; 348/335; 348/340; 348/342

(58) Field of Classification Search ................. 348/345, 348/337, 338, 89; 396/89
See application file for complete search history.

(56) References Cited

U.S. PATENT DOCUMENTS

| | | | |
|---|---|---|---|
| 4,074,930 A | | 2/1978 | Folsom et al. |
| 5,172,189 A | * | 12/1992 | Mitome ...................... 356/401 |
| 5,231,443 A | * | 7/1993 | Subbarao ..................... 396/93 |
| 5,398,064 A | | 3/1995 | Saka |
| 5,398,096 A | * | 3/1995 | Yagoto ......................... 355/55 |
| 5,583,602 A | * | 12/1996 | Yamamoto ................... 396/133 |
| 5,691,854 A | | 11/1997 | Yoshida et al. |
| 5,910,816 A | * | 6/1999 | Fontenot et al. ............... 348/65 |
| 6,005,612 A | * | 12/1999 | Kikuchi et al. ............. 348/222.1 |
| 6,249,362 B1 | * | 6/2001 | Sato et al. .................... 358/527 |
| 6,426,777 B1 | * | 7/2002 | Sato .......................... 348/373 |
| 6,714,247 B1 | * | 3/2004 | Numazaki et al. ............ 348/370 |
| 2002/0186304 A1 | * | 12/2002 | Kono et al. ............... 348/216.1 |

FOREIGN PATENT DOCUMENTS

JP 2003-069865 3/2003

OTHER PUBLICATIONS

Chinese Office Action dated Sep. 7, 2007 for corresponding Chinese application No. 2004100475488 and English translation thereof.

* cited by examiner

*Primary Examiner*—Tuan Ho
*Assistant Examiner*—Usman Khan
(74) *Attorney, Agent, or Firm*—Harness, Dickey & Pierce, P.L.C.

(57) ABSTRACT

The present invention provides a visible and infrared light photographing lens system. A color separating prism or the like divides an object light entering a photographing lens and then passing through a focus lens, into an object light in a visible light region and an object light in an infrared light region. A visible light image pickup element and an infrared light image pickup element are used to pick up images of the respective object lights. Further, a compensation lens can be used to adjust a position where an image of the object light in the infrared light region is formed. Consequently, visible light photographing and infrared light photographing can be simultaneously carried out by focusing on an object at the same distance.

10 Claims, 7 Drawing Sheets

——— INFRARED REFLECTED LIGHT
------ VISIBLE TRANSMITTED LIGHT

FIG.3

| DISTANCE / MAGNIFICATION | 2.2m | 2.4m | 2.8m | 3.1m | 3.7m | 4.4m | 5.5m | 7.3m | 11.0m | 22.0m | ∞ (INF) |
|---|---|---|---|---|---|---|---|---|---|---|---|
| 1.0× | -0.693 | -0.693 | -0.693 | -0.693 | -0.692 | -0.692 | -0.692 | -0.691 | -0.691 | -0.691 | -0.691 |
| 2.0× | -0.813 | -0.813 | -0.811 | -0.810 | -0.809 | -0.808 | -0.807 | -0.806 | -0.805 | -0.804 | -0.803 |
| 4.0× | -0.934 | -0.931 | -0.925 | -0.922 | -0.917 | -0.913 | -0.909 | -0.904 | -0.900 | -0.896 | -0.891 |
| 6.0× | -1.033 | -1.025 | -1.013 | -1.006 | -0.995 | -0.986 | -0.976 | -0.966 | -0.956 | -0.946 | -0.936 |
| 9.0× | -1.215 | -1.197 | -1.169 | -1.153 | -1.128 | -1.107 | -1.086 | -1.064 | -1.042 | -1.020 | -0.998 |
| 12.0× | -1.458 | -1.427 | -1.379 | -1.350 | -1.306 | -1.270 | -1.232 | -1.194 | -1.155 | -1.117 | -1.079 |
| 15.0× | -1.744 | -1.703 | -1.636 | -1.595 | -1.531 | -1.476 | -1.418 | -1.360 | -1.300 | -1.242 | -1.183 |
| 18.0× | -2.036 | -1.996 | -1.925 | -1.877 | -1.797 | -1.724 | -1.644 | -1.562 | -1.477 | -1.393 | -1.309 |
| 20.0× | -2.293 | -2.208 | -2.120 | -2.070 | -1.986 | -1.907 | -1.815 | -1.717 | -1.613 | -1.509 | -1.406 |
| 22.0× | -2.632 | -2.515 | -2.370 | -2.302 | -2.193 | -2.096 | -1.987 | -1.873 | -1.752 | -1.629 | -1.506 |
| 24.0× | -3.010 | -2.901 | -2.681 | -2.585 | -2.442 | -2.314 | -2.169 | -2.021 | -1.866 | -1.713 | -1.561 |

VISIBLE AND INFRARED LIGHT PHOTOGRAPHING LENS SYSTEM

BACKGROUND OF THE INVENTION

1. Field of the Invention

The present invention relates to a visible and infrared light photographing lens system, and in particular, to a visible and infrared light photographing lens system which enables the same object to be photographed simultaneously using a visible light and an infrared light.

2. Description of the Related Art

If a television camera (for example, a CCTV camera) is used to photograph images for monitoring or other applications, the photographing is carried out with a visible light in a bright environment such as in the daytime and with an infrared (near infrared) light in a dark environment such as in the nighttime when an object cannot be observed.

In the prior art, a single camera may be used to carry out both visible light photographing and infrared light photographing. A camera is known in which a photographing lens installed in the camera main body need not be changed from one for a visible light to one for an infrared light. For example, if a photographing lens designed for photographing with a visible light is used directly for photographing with an infrared light, the infrared light may disadvantageously increase the magnitude of axis chromatic aberrations. In particular, if a photographing lens for a visible light having a zoom function is used for an infrared light, when a zoom magnification is changed, the object may be out of focus even if tracking adjustment (flange back adjustment) is carried out. Thus, disadvantageously, the tracking adjustment (flange back adjustment) cannot be effectively carried out.

Accordingly, if a photographing lens for a visible light is also used for photographing with an infrared light, the following method is applied: a method of optically reducing the magnitude of color aberrations down to an infrared wavelength region using low-dispersion glass such as fluorite or ED glass for a lens or a method of inserting an optical member (lens, prism) into an optical system of the photographing lens to compensate for the color aberrations.

Further, under a little dark photographing conditions such as in the evening, it may be desirable to simultaneously execute photographing with an infrared light which enables the object to be clearly photographed and photographing with a visible light which provides color information on the object. However, if a single camera is switched between visible light photographing and infrared light photographing, these photographing operations cannot be simultaneously preformed. Thus, in the prior art, two cameras for visible and infrared lights, respectively, may be used to execute simultaneous photographing. However, if the two cameras are used, they must be simultaneously operated in carrying out focusing, zooming, or the like so that their photographing distances (the distance to the object position at which the camera can be focused on the object (object distance)) or angles of view are equal to each other. This requires much time and effort. Further, the use of the two cameras may result in parallax between the cameras. In this case, the angle of view of a video photographed using a visible light may not be equal to the angle of view of a video photographed using an infrared light.

In contrast, Japanese patent application Publication No. 2003-69865 proposes an image pickup apparatus in which a half mirror divides an object light incident on a photographing lens, into an object light for a visible light and an object light for an infrared light which are used to pick up an image. This apparatus can make the angle of view of a video photographed using a visible light equal to the angle of view of a video photographed using an infrared light.

Alternatively, it is possible to use two cameras for visible and infrared lights, respectively, and divide an object light from an object to be photographed into an object light for a visible light and an object light for an infrared light using a mirror or a prism. In this case, the object lights obtained are allowed to enter photographing lens of the visible and infrared light cameras, respectively, so as to make the angle of view of a video photographed with the visible light camera equal to the angle of view of a video photographed with the infrared light camera.

SUMMARY OF THE INVENTION

However, Japanese patent application Publication No. 2003-69865 does not assume simultaneous photographing with visible and infrared lights. Accordingly, a problem may occur if visible light photographing and infrared light photographing are simultaneously carried out. Specifically, if an optical system including a focus lens (a group of focus lenses) and a zoom lens (a group of zoom lenses) is placed in front of a half mirror, the wavelength characteristic of the optical system varies between a visible light region and an infrared light region. Thus, when the focus and zoom lens are set at predetermined positions and even if the photographing distance for the visible light is equal to the photographing distance for the infrared light, the photographing distances may disadvantageously become unequal if the focus or zoom lens is moved from its predetermined position. Further, Japanese patent application Publication No. 2003-69865 has no devices that individually adjust the focus position for the visible and infrared lights. Consequently, it cannot compensate for any difference in photographing distance between the visible light and the infrared light.

On the other hand, if an object light from an object to be photographed is divided into an object light for a visible light and an object light for an infrared light using a mirror or a prism so that the object lights obtained are allowed to enter photographing lens of a visible and infrared light cameras, respectively, as described above, the photographing lenses of the respective cameras can be used to individually adjust the focus. It is thus possible to focus on the object at the same position. However, if the two cameras are used, they must be simultaneously operated in carrying out focusing, zooming, or the like so that their photographing distances or angles of view are equal to each other. This requires much time and effort. Further, the size of the whole apparatus must be increased and the two photographing lenses are required for the visible and infrared light cameras. This increases costs. Moreover, if the mirror or prism is placed in front of the photographing lens, it must be larger than a front lens of the photographing lens. Consequently, a relatively large mirror or prism must be used in the apparatus, thus increasing the size of the apparatus and costs.

In view of these circumstances, it is an object of the present invention to provide a visible and infrared light photographing lens system which enables the same object to be easily photographed simultaneously with a visible and infrared lights without requiring much time or effort and which can suppress an increase in the size of the apparatus and in costs.

To accomplish the above object, a first aspect of the present invention provides a visible and infrared light photographing lens system which enables the same object to be photographed simultaneously using a visible light and an infrared light, the system comprising a focus lens which can be moved in a direction of an optical axis in order to focus on the object at a desired object distance, a light dividing device which divides an object light having passed through the focus lens, into an object light for a visible light and an object light for an infrared light and which guides the object light for the visible light and the object light for the infrared light through a visible light optical path and an infrared light optical path, respectively, a visible light image pickup device which picks up an object image of a visible light using the object light for the visible light, an infrared light image pickup device which picks up an object image of an infrared light using the object light for the infrared light, a compensation lens placed in at least one of the visible light optical path and the infrared light optical path so as to be movable in the direction of the optical axis, the compensation lens adjusting a position at which the object light passing through the compensation lens is formed into an image, and a compensation lens control device which controls a position of the compensation lens on the basis of a position of the focus lens so that an object distance to the object at which the visible light image pickup device can be focused on the object is equal to an object distance to the object at which the infrared light image pickup device can be focused on the object.

A second aspect of the present invention provides the visible and infrared light photographing lens system according to the first aspect, further comprising a zoom lens in front of the light dividing device, the zoom lens being movable in the direction of the optical axis in order to vary a zoom magnification, wherein the compensation lens control device controls the position of the compensation lens on the basis of a position of the focus lens and a position of the zoom lens.

A third aspect of the present invention provides the visible and infrared light photographing lens system according to the first or second aspect, wherein the light dividing device is a dichloic mirror or a color separating prism, and a spectrum is obtained on the basis of wavelength regions by setting the object light for the visible light to be an object light in a visible light region and setting the object light for the infrared light to be an object light in an infrared light region.

A fourth aspect of the present invention provides the visible and infrared light photographing lens system according to the first or second aspect, wherein an iris is placed in each of the visible light optical path and the infrared light optical path through which the object light for the visible light and the object light for the infrared light, respectively, into which the object light has been divided by the light dividing device, are guided.

A fifth aspect of the present invention provides the visible and infrared photographing means according to the first or second aspect, characterized in that an iris is placed in front of the light dividing device.

A sixth aspect of the present invention provides the visible and infrared light photographing lens system according to the first or second aspect, characterized in that the iris is placed in front of the light dividing device, and a light quantity adjusting device is placed in both or one of the visible light optical path and the infrared light optical path through which the object light for the visible light and the object light for the infrared light, respectively, into which the object light has been divided by the light dividing device, are guided.

A seventh aspect of the present invention provides a visible and infrared light photographing lens system which enables the same object to be photographed simultaneously using a visible light and an infrared light, the system comprising a focus lens which can be moved in a direction of an optical axis in order to focus on the object at a desired object distance, a light dividing device which divides an object light having passed through the focus lens, into an object light for a visible light and an object light for an infrared light and which guides the object light for the visible light and the object light for the infrared light through a visible light optical path and an infrared light optical path, respectively, a visible light image pickup device which picks up an object image of a visible light using the object light for the visible light, an infrared light image pickup device which picks up an object image of an infrared light using the object light for the infrared light, and a control device which controls an image pickup surface of the visible light image pickup device or the infrared light image pickup device on the basis of the focus lens so that an object distance to the object at which the visible light image pickup device can be focused on the object is equal to an object distance to the object at which the infrared light image pickup device can be focused on the object.

An eighth aspect of the present invention provides the visible and infrared light photographing lens system according to the seventh aspect, characterized by further comprising a zoom lens in front of the light dividing device, the zoom lens being movable in the direction of the optical axis in order to vary a zoom magnification, and in that the control device controls the image pickup surface on the basis of a position of the focus lens and a position of the zoom lens.

According to the present invention, the compensation lens and others are used to make the object distance to the object at which the object can be focused on with visible light photographing equal to the object distance to the object at which the object can be focused on with infrared light photographing. Consequently, it is possible to focus on and simultaneously photograph the same object at the same object distance for the visible and infrared lights. Further, the compensation lens and others are automatically controlled on the basis of, for example, the position of the focus lens. This avoids causing the photographer much trouble.

Further, the light dividing device, which divides the object light into the visible light object light and the infrared light object light, is placed behind the focus lens, used for both visible light photographing and infrared light photographing. This prevents an increase in the size of the light dividing device and thus an increase in the size of the system and in costs. The costs can also be reduced by using the focus lens for both visible light photographing and infrared light photographing.

BRIEF DESCRIPTION OF THE DRAWINGS

FIG. 3 is a data table showing an example of compensation data for a compensation lens;

DETAILED DESCRIPTION OF THE PREFERRED EMBODIMENTS

With reference to the accompanying drawings, description will be given below of preferred embodiments of a visible and infrared light photographing lens system according to the present invention.

Figure 1:
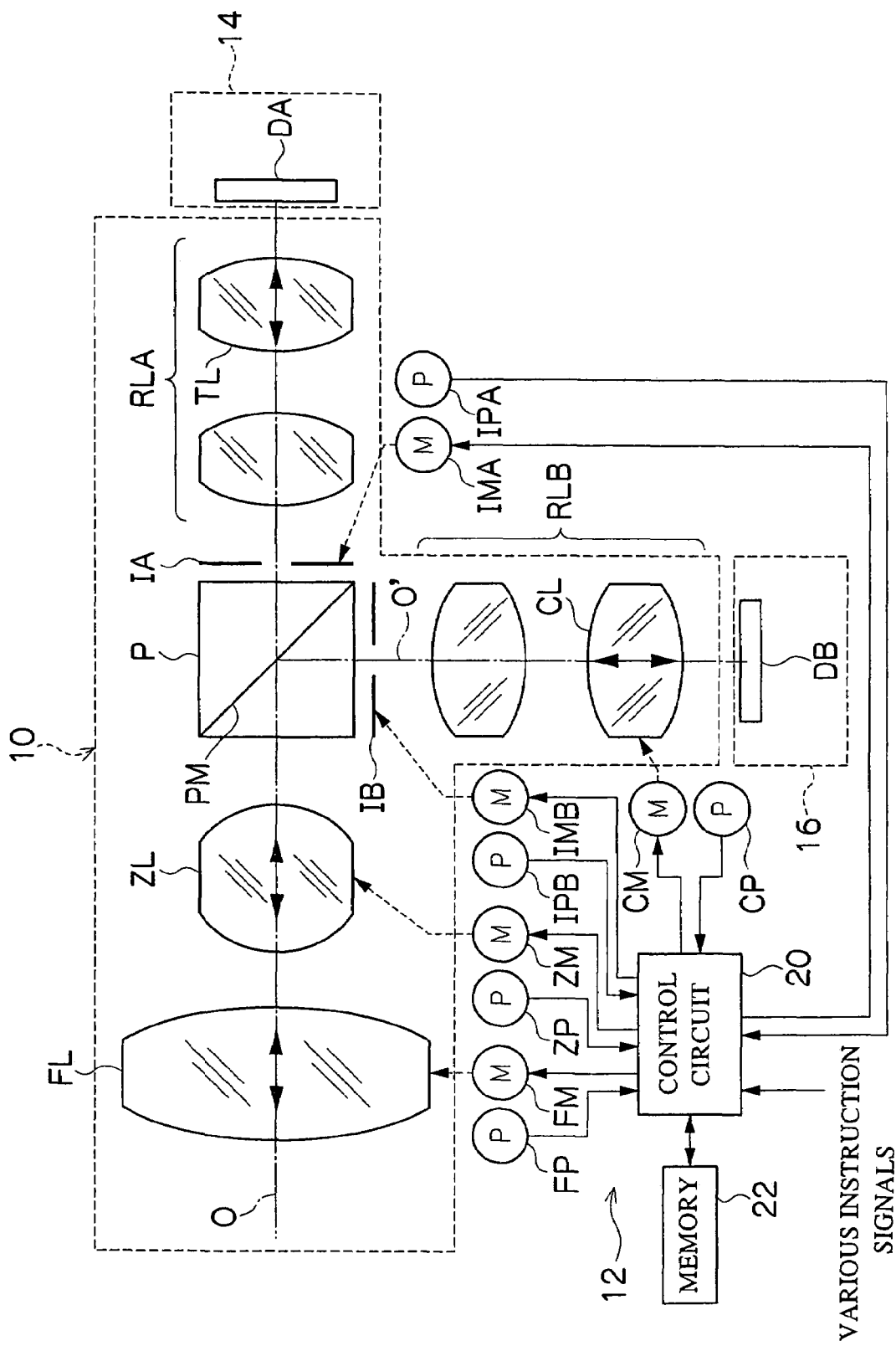
FIG. 1 is a view showing the general configuration of a lens system to which the present invention is applied.

FIG. 1 is a view showing the general configuration of a lens system to which the present invention is applied. The lens system in this figure is used in a monitoring television camera or the like. It can photograph the same object simultaneously with a visible light and an infrared (near infrared) light. As shown in FIG. 1, the present lens system comprises a lens device composed of an optical system (photographing lens) 10 and a control system 12, a visible light camera main body 14 in which an image pickup element (CCD) DA picking up an image of an object using an object light in a visible light wavelength region (visible light region) is mounted, and an infrared light camera main body 16 in which an image pickup element (CCD) DB picking up an image of an object using an object light in an infrared light wavelength region (infrared light region) is mounted. A photographing lens 10 has various optical parts arranged in its lens barrel and can be mounted on and removed from the visible light camera main body 14 and infrared light camera main body 16 in a predetermined manner.

The photographing lens 10 is provided with a visible light optical path through which an object light in the visible light region contained in an incident object light is guided to the image pickup element DA of the visible light camera main body 14 and an infrared light optical path through which an object light in the infrared light region contained in the incident object light is guided to the image pickup element DB of the infrared light camera main body 16.

In the visible light optical path, a focus lens (a group of focus lenses) FL, a zoom lens (a group of zoom lenses) ZL, a color separating prism P, an iris (iris mechanism) IA, and a relay lens (a group of relay lenses) RLA are arranged in this order from an objective side along an optical axis O. The image pickup element DA of the visible light camera main body 14 is placed behind the relay lens (a group of relay lenses) RLA.

On the other hand, in the infrared light optical path, the same focus lens FL, zoom lens ZL, and color separating prism P as those in the visible light optical path are arranged in this order from the objective side along the optical axis O. Following the color separating prism P, an iris (iris mechanism) IB and relay lens (a group of relay lenses) RLB are arranged along an optical axis O' almost orthogonal to the optical axis O. The image pickup element DB of the infrared light camera main body 16 is placed behind the relay lens RLB.

With the visible and infrared light optical paths, an object light in the visible light region contained in the object light incident on the photographing lens 10 passes through the focus lens FL, the zoom lens ZL, the color separating prism P, the iris IA, and the relay lens RLA in this order. The object light in the visible light region is then incident on an image pickup surface of the visible light image pickup element DA. On the other hand, an object light in the infrared light region passes through the focus lens FL, the zoom lens ZL, the color separating prism P, the iris IB, and the relay lens RLB in this order. The object light in the infrared light region is then incident on an image pickup surface of the infrared light image pickup element DB.

An optical system composed of the lenses and others arranged in the visible light optical path will hereinafter be referred to as a visible light optical system. An optical system composed of the lenses and others arranged in the infrared light optical path will hereinafter be referred to as an infrared light optical system.

The focus lens FL is moved forward and backward by a focusing motor FM in the direction of the optical axis O. The focus lens FL is driven in order to adjust the foci of the visible and infrared light optical systems. If the position of the focus lens FL changes, an image forming effect of the visible light optical system on the object light in the visible light region changes the distance to the object position (an object surface conjugate with the image pickup surface) at which the image pickup surface of the visible light image pickup element DA can be focused on the object. Further, an image forming effect of the infrared light optical system on the object light in the infrared light region changes the distance to the object position at which the image pickup surface of the infrared light image pickup element DB can be focused on the object. In the description below, the distance to the object position at which the image pickup surface of the image pickup element DA can be focused on the object is referred to as the object distance of the visible light optical system. The distance at to the object position which the image pickup surface of the image pickup element DB can be focused on the object is referred to as the object distance of the infrared light optical system.

The zoom lens ZL is moved forward and backward by a zooming motor ZM in the direction of the optical axis O. The zoom lens ZL is driven in order to adjust the zooming (focal distance) of the visible and infrared light optical systems. The zoom lens ZL is composed of a variator lens (a group of variator lenses) and a compensator lens (a group of compensator lenses). The variator lens and the compensator lens operate in unison in a predetermined positional relationship to compensate so that the image formation positions of the object lights in the visible and infrared light regions will not vary when a zoom magnification (focal distance) is changed. In other words, compensation is made so as not to vary the object distances of the visible and infrared light optical systems. However, for the object distance of the infrared light optical system, a variation resulting from a change in zoom magnification cannot be completely compensated for. Accordingly, a compensation lens CL is used for compensation as described later.

The color separating prism P uses its mirror surface PM to separate the incident object light into the object light in the visible light region and the object light in the near infrared light region. Thus, the object light in the visible light region is transmitted, while the object light in the infrared light region is reflected. Consequently, the object light in the visible light region keeps on advancing in the direction of the optical axis O, while the object light in the infrared light region advances in the direction of the optical axis O', which is almost perpendicular to the optical axis O.

Figure 2:
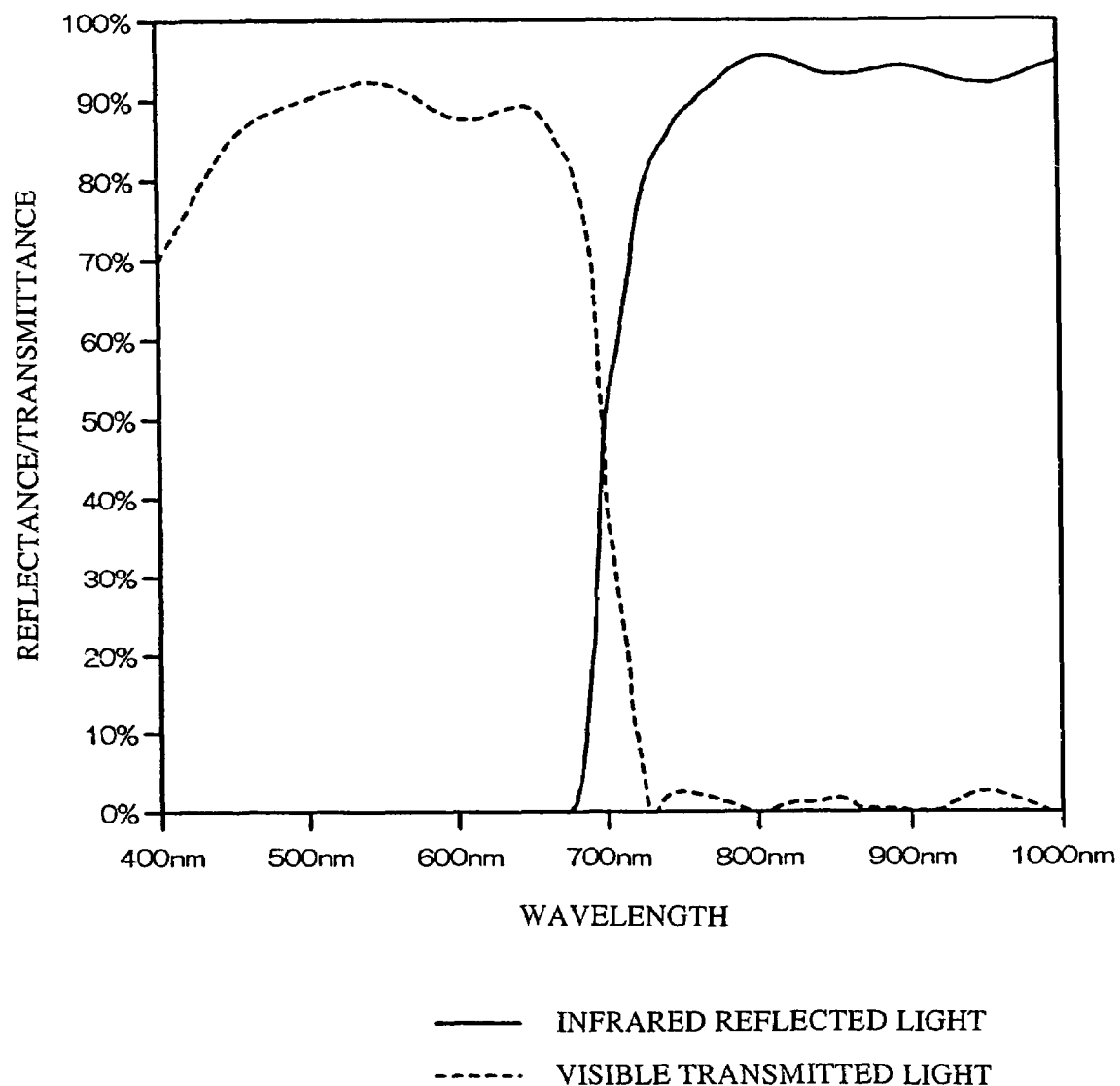
FIG. 2 is a graph showing an example of a wavelength characteristic of a color separating prism.

FIG. 2 shows an example of the wavelength characteristic of the color separating prism P. As shown in the figure, the object light in the visible light region having a wavelength shorter than about 700 nm passes through the color separating prism P at a transmittance of about 90%. The object light in the infrared light region having a wavelength longer than about 700 nm is reflected by the color separating prism P at a reflectance exceeding about 90%.

A dichroic mirror or a half mirror may be used in place of the color separating prism P so that the object light incident on the photographing lens 10 is divided into an object light for a visible light and an object light for an infrared light. However, if instead of the color separating prism and dichroic mirror, which divide the object light on the basis of wavelength regions, the half mirror, which divides the object light into lights in almost equivalent wavelength regions, is used as a light dividing device, then a filter is desirably used to remove lights in unwanted wavelength regions from the visible and infrared light object lights obtained by the division.

The iris IA is opened and closed by an iris motor IMA. The iris IA is driven so as to be adjusted for the visible light optical system, that is, to adjust the quantity of object light in the visible light region incident on the image pickup surface of the image pickup element DA.

The relay lens RLA is a group of lenses that finally forms the object light in the visible light region having passed through the iris IA, into an image. A tracking lens (a group of tracking lenses) TL for tracking (flange back adjustment) placed in a part of the iris IA can be moved forward and backward in the direction of the optical axis O. The tracking lens TL is manually operated in order to track the visible light optical system, for example, before photographing is started. The tracking lens TL is set at such a position as prevents the image formation position (that is, the object distance of the visible light optical system) of the visible light optical system from varying even when the zoom lens ZL is moved from wide end to telescope end. In the illustrated system, the tracking lens TL is manually operated. However, it may be driven by a motor.

The image pickup element DA of the visible light camera main body 14 photoelectrically converts the object light in the visible light region formed into an image on the image pickup surface. The image pickup element DA then outputs the image of the object as an electric signal. The visible light camera main body 14 is provided with a required signal processing circuit. The signal processing circuit converts the signal outputted by the image pickup element DA into a video signal. The video signal is outputted to external equipment or the like.

The iris IB is opened and closed by an iris motor IMB. The iris IB is driven so as to be adjusted for the infrared light optical system, that is, to adjust the quantity of object light in the infrared light region incident on the image pickup surface of the image pickup element DB.

The relay lens RLB is a group of lenses that finally forms the object light in the infrared light region having passed through the iris IB, into an image. A compensation lens (a group of compensation lenses) CL structurally similar to the tracking lens TLA is placed in a part of the iris IB. The compensation lens CL can be moved forward and backward by a compensation motor CM in the direction of the optical axis O'. The compensation lens CL is driven so as to follow a variation in the position of the focus lens FL or zoom lens ZL. Specifically, when the position of the compensation lens CL is changed, the image formation position of the object light in the infrared light region and thus the object distance of the infrared light optical system change. Accordingly, the position of the compensation lens CL is controlled so as to make the object distance of the infrared light optical system equal to the object distance of the visible light optical system, that is, to the object distance expected in association with the position of the focus lens FL. This will be described later.

The image pickup element DB of the infrared light camera main body 16 photoelectrically converts the object light in the infrared light region formed into an image on the image pickup surface. The image pickup element DB then outputs the image of the object as an electric signal. The infrared light camera main body 16 is provided with a required signal processing circuit. The signal processing circuit converts the signal outputted by the image pickup element DB into a video signal. The video signal is outputted to external equipment or the like.

While using potentiometers FP, ZP, IPA, IPB, and CP to detect the positions of the focus lens FL, zoom lens ZL, iris IA, iris IB, and compensation lens CL, a control circuit 20 in the control system 12 drives the focus motor FM, the zoom motor ZM, the iris motors IMA and IMB, and the compensation motor CM to control the position of each lens or iris (or their operation speed).

For example, on the basis of a focus or zoom operation performed by the operator using a controller (not shown), the controller gives the control circuit 20 an instruction signal indicating a movement target position (or movement target speed) of the focus lens FL or zoom lens ZL. On the basis of the given instruction signal, the control circuit 20 drivingly controls the focus motor FM or the zoom motor ZM to control the position or speed of the focus lens FL or zoom lens ZL.

Further, for example, each of the visible light camera main body 14 and the infrared light camera main body 16 requires an iris value at which a video picked up by the image pickup element DA or DB, respectively, has an appropriate brightness. The camera main body 14 or 16 gives the control circuit 20 an instruction signal instructing on the setting of the iris at that value. On the basis of this instruction signal, the control circuit 20 drives the iris motors IMA and IMB to control the positions of the irises IA and IB. This sets the iris IA at such a position as allows a video picked up by the image pickup element DA to have an appropriate brightness. The iris IB is set at such a position as allows a video picked up by the image pickup element DB to have an appropriate brightness.

The focus lens FL, the zoom lens ZL, and the irises IA and IB may be controlled using a method different from the one described above.

On the other hand, the compensation lens CL is controlled by referencing compensation data pre-stored in the memory 22 to drive the compensation motor CM so as to place the compensation lens CL at a position read from the compensation data.

Here, the object distance of the visible light optical system is equal to the object distance expected in association with the position of the focus lens FL. Further, pre-tracking adjustment with the tracking lens TLA prevents the object distance from varying even when the position of the zoom lens ZL is changed. On the other hand, the object distance of the infrared light optical system is designed so that the optical parts (focus lens FL, zoom lens ZL, and others) also used for the visible light optical system fit the object light in the visible light region. Accordingly, the object distance of the infrared light optical system is not equal to the object distance expected in association with the position of the focus lens FL (that is, the object distance of the visible light optical system). Additionally, the amount of deviation varies depending on the position of the focus lens FL. Further, when the position of the zoom lens ZL is changed, the object distance of the infrared light optical system varies, the amount of variation varies depending on the position of the zoom lens ZL.

Thus, the position of the compensation lens CL is controlled and the object distance of the infrared light optical system compensated for so as to make the object distance of the infrared light optical system is equal to the object distance expected in association with the position of the focus lens FL (that is, the object distance of the visible light optical system) and to prevent the object distance of the infrared light optical system from varying even when the position of the zoom lens ZL is changed. The position of the compensation lens CL required to compensate for the object distance of the infrared light optical system is pre-calculated by logical arithmetic operations or the like with respect to the positions of the focus lens FL and zoom lens ZL. This position is stored in the memory 22 as compensation data. With reference to this compensation data, the position of the compensation lens CL for photographing is determined.

Figure 4:
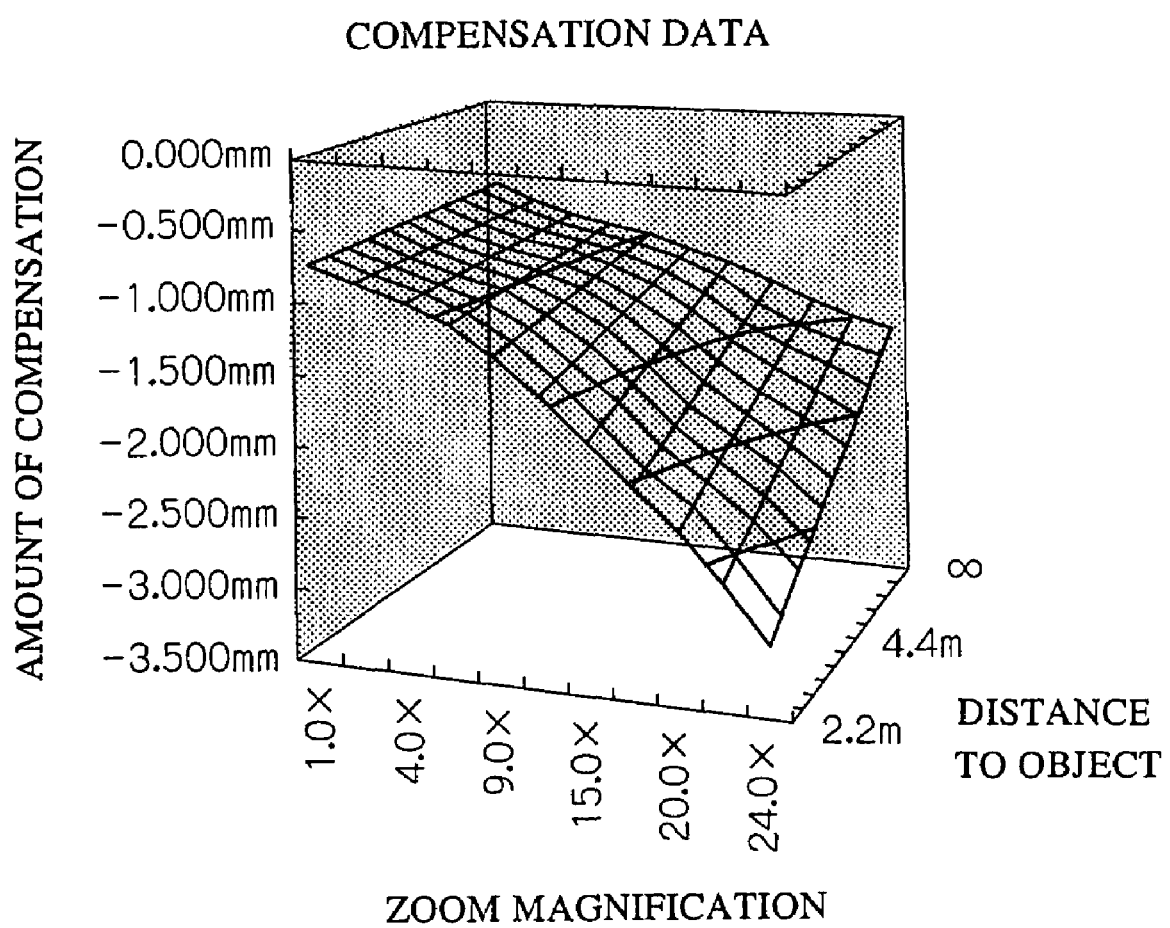
FIG. 4 is a three-dimensional graph of the compensation data in FIG. 3.

FIG. 3 is a data table showing an example of compensation data. FIG. 4 is a three-dimensional graph also showing the compensation data. As is apparent from these figures, the compensation data is the amount of compensation from a predetermined reference position on the compensation lens CL in association with the positions of the focus lens FL and zoom lens ZL. The positions of the focus lens FL and zoom lens ZL in the compensation data are the current positions of the focus lens F1 and zoom lens ZL read from the potentiometers FP and ZP or the target positions of the focus lens FL and zoom lens ZL to be set on the basis of the instruction signal. Then, by reading the amount of compensation by the compensation lens CL from the compensation data in association with the above positions of the focus lens FL and zoom lens ZL, it is possible to determine the amount of compensation from a reference position on the compensation lens CL required to make the object distance of the infrared light optical system equal to the object distance of the visible light optical system.

In compensation data in a format such as the one shown in FIGS. 3 and 4, the amount of compensation by the compensation lens CL is associated with the discrete positions of the focus lens FL and zoom lens ZL. Accordingly, the desired amount of compensation by the compensation lens CL with respect to the positions of the focus lens FL and zoom lens ZL may not be able to be read directly from the compensation data. In such a case, for example, the data can be interpolated using an interpolating operation to determine the amount of compensation by the compensation lens CL with respect to the desired positions of the focus lens FL and zoom lens ZL.

Further, the compensation data indicates the optimum amount of compensation for an object light of a particular wavelength (main wavelength) within the infrared light region. For example, if photographing is carried out using an infrared light, the object may be illuminated using an infrared lighting equipment. In this case, the compensation data is suitably set for the main wavelength (wavelength of the highest intensity) of this illumination light. For example, if the illumination light has a main wavelength of 950 nm, the compensation data suitably should provide the optimum amount of compensation for an object light of 950 nm. Further, several types of compensation data for different main wavelengths may be stored in the memory 22 so that the user can properly select one of the compensation data for actual reference, in accordance with the main wavelength of the illumination light or the like. Alternatively, a sensor may be used to detect a main wavelength in order to select the optimum compensation data suitably set for the main wavelength.

Furthermore, the method of determining the amount of compensation by the compensation lens CL is not limited to the one described above. Other methods may be used; for example, an equation may be used to determine the amount of compensation.

Additionally, precisely speaking, the object distance of the infrared light optical system varies depending on the position of the iris IB. Accordingly, the amount of compensation by the compensation lens CL is suitably determined taking the position of the iris IB into account in addition to the positions of the focus lens FL and zoom lens ZL.

Moreover, the reference position of the compensation lens CL may need to be changed depending on the position of the tracking lens TL in the visible light optical system. In this case, the control circuit 20 may be adapted to detect the position of the tracking lens TL so that the appropriate reference position for the position of the tracking lens TL can be adjusted using a data table pre-stored in the memory 22.

To displace the focus lens FL or the zoom lens ZL on the basis of an instruction signal, the control circuit 20 reads, from the compensation data as previously described, the amount of compensation by the compensation lens CL with respect to the current positions of the focus lens FL and zoom lens ZL read from the potentiometers FP and ZP or the target positions of the focus lens FL and zoom lens ZL to be set on the basis of the instruction signal. Then, the compensation lens CL is displaced from the predetermined reference position by the compensation amount read from the compensation data to make the object distance of the infrared light optical system equal to the object distance of the visible light optical system. This allows the object position on which the focus can be placed using the visible light optical system to coincide with the object position on which the focus can be placed using the infrared light optical system. It is thus possible to enable a video of the visible light and a video of the infrared light both focusing on the same object to be simultaneously photographed using the image pickup elements DA and DB. Since the zoom lens ZL is shared by the visible and infrared light optical systems, a video of the visible light and a video of the infrared light have an almost equal zoom magnification (photographing angle of view). However, the videos need not necessarily have an equal photographing angle of view. It is operationally sufficient that the photographing positions of the videos each indicated by the center of the photographing angle of view are almost equal. This at least meets this condition.

As described above, in the above embodiments, the compensation lens CL is used to compensate for the object distance of the infrared light optical system depending on the positions of the focus lens FL and zoom lens ZL. However, instead of the object distance of the infrared light optical system, the object distance of the visible light optical system may be compensated for depending on the positions of the focus lens FL and zoom lens ZL. That is, the configuration and control of the visible light optical system in the above embodiment may be used as the configuration and control of the infrared light optical system. On the other hand, the configuration and control of the infrared light optical system in the above embodiment may be used as the configuration and control of the visible light optical system.

In the above embodiments, the object light in the visible light region is transmitted through the color separating prism P, while the object light in the infrared light region is reflected by the color separating prism P. This may be reversed.

In the description of the above embodiments, the present invention is applied to the photographing lens comprising the focus lens FL and the zoom lens ZL. However, the present invention is also applicable to a photographing lens having a fixed focal distance but not comprising the zoom lens ZL, or single-vision lens.

In the above embodiments, the object distance of the infrared light optical system is compensated for by moving the position of the compensation lens CL. However, the object distance of the infrared light optical system may be compensated for by moving the position of the image pickup surface of the image pickup element DB instead of the position of the compensation lens CL. The position of the image pickup surface of the image pickup element DB may be moved by, instead of directly moving the image pickup element DB, moving a mount portion in which the photographing lens 10 is mounted in the infrared light camera main body 16 and moving the whole infrared light camera main body 16 with respect to the photographing lens 10.

Figure 5:
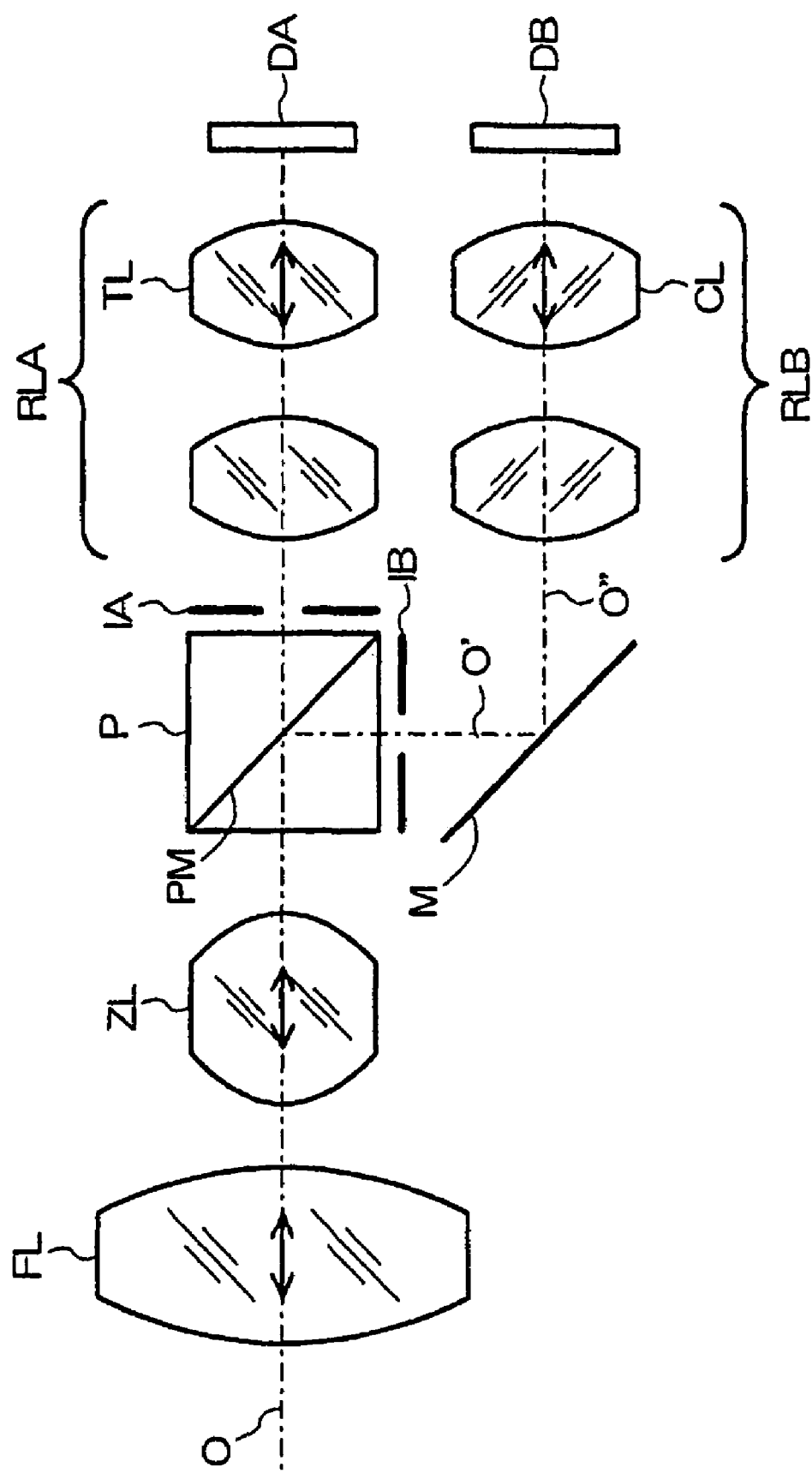
FIG. 5 is a view showing the configuration of another embodiment of the photographing lens.

In the above embodiments, in the infrared light optical system, the object light in the infrared light region is reflected by the mirror surface PM of the separating prism P. Consequently, an image photographed by the image pickup element DB is reversed. To avoid this reversal, signal processing may be executed after photographing to electrically reverse the image. However, the image may be optically reversed. FIG. 5 shows how the photographing lens is configured in this case. In FIG. 5, components producing the same effects as or effects similar to those in FIG. 1 are designated by the same reference numerals. Their description is thus omitted. The photographing lens 10 shown in FIG. 5 has the same configuration of the visible light optical system as that of the photographing lens 10 shown in FIG. 1 except for the configuration of the infrared light optical system. Specifically, in the infrared light optical system in FIG. 5, the object light in the infrared light region advancing along the optical axis O' after being reflected by the mirror surface PM of the color separating prism P is subsequently reflected by a mirror M so as to travel in the direction of an optical axis O" almost perpendicular to the optical axis O'. The object light then passes through the relay lens RLB on the optical axis O". The object light finally enters the image pickup surface of the image pickup element DB of the infrared light camera main body 16. The object light in the infrared light region is thus reflected by the mirror M, placed in the infrared light optical system. This optically avoids the reversal of the image photographed by the image pickup element DB.

Figure 6:
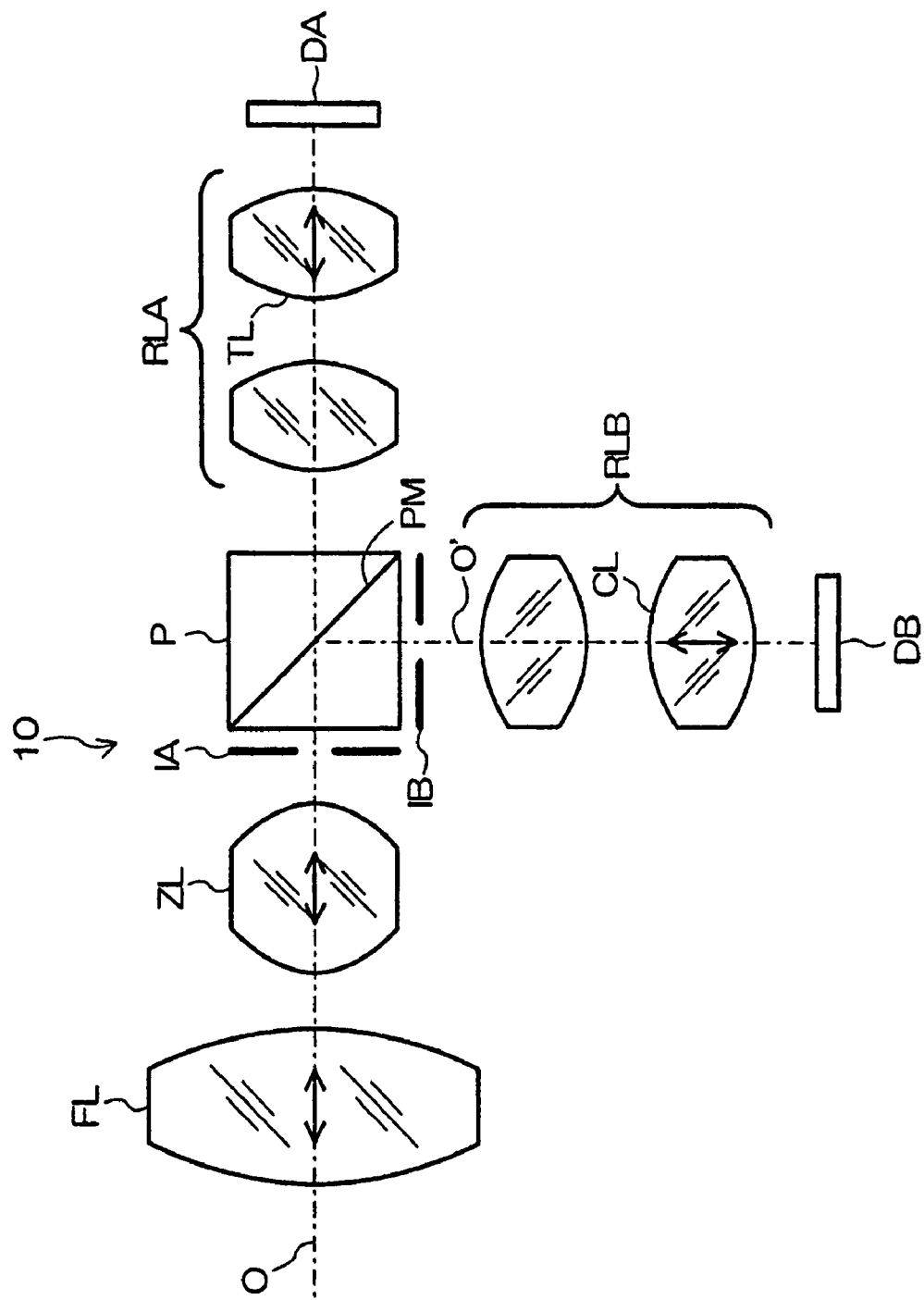
FIG. 6 is a view showing the configuration of another embodiment of the photographing lens.

In the above embodiments, the irises IA and IB are arranged at the positions separately passed by the object light in the visible light region and the object light in the infrared light region, into which the original object light has been divided by the color separating prism P. However, one of the irises IA and IB may be placed at a position passed by the object light not having been divided by the color separating prism P. However, if photographing is carried out using an infrared light, infrared lighting equipment is often used to irradiate the object with the infrared light. Thus, the object light in the infrared light region is often more intense than the object light in the visible light region. In view of this, instead of the iris IB, the iris IA is suitably placed in front of the color separating prism P. FIG. 6 shows the configuration of the photographing lens in which the iris IA, shown in FIG. 1, is placed in front of the color separating prism P. In FIG. 6, components producing the same effects as or effects similar to those in FIG. 1 are designated by the same reference numerals. Their description is thus omitted. If the iris IA is placed in front of the color separating prism P as in the case of the photographing lens 10 shown in FIG. 6, then the iris IA operates as a light quantity adjusting mechanism shared by the visible and infrared light optical systems. In this case, the iris IA is controlled by an iris value indicated by an instruction signal from the visible light camera main body 14. The iris IA is set at a position where a video photographed with the object light in the visible light region has an appropriate brightness. On the other hand, the iris IB is controlled by an iris value indicated by instruction signal from the infrared light camera main body 16. In this case, both irises IA and IB should meet the iris value instructed on by the instruction signal from the infrared light camera main body 16. Accordingly, the position of the iris IB is controlled taking the position of the iris IA into account. If the video photographed with the object light in the infrared light region is too bright when the quantity of light is adjusted using only the iris IA, the iris IB is effectively used to further restrict the quality of object light in the infrared light region.

The present invention is not limited to the configuration shown in FIG. 6. If the iris is placed in front of the color separating prism P, the light quantity adjusting mechanism such as the iris, an ND filter switching mechanism, or a liquid crystal variable transmission mechanism may be placed in both or one of the visible and infrared light optical paths behind the color separating prism P.

Figure 7:
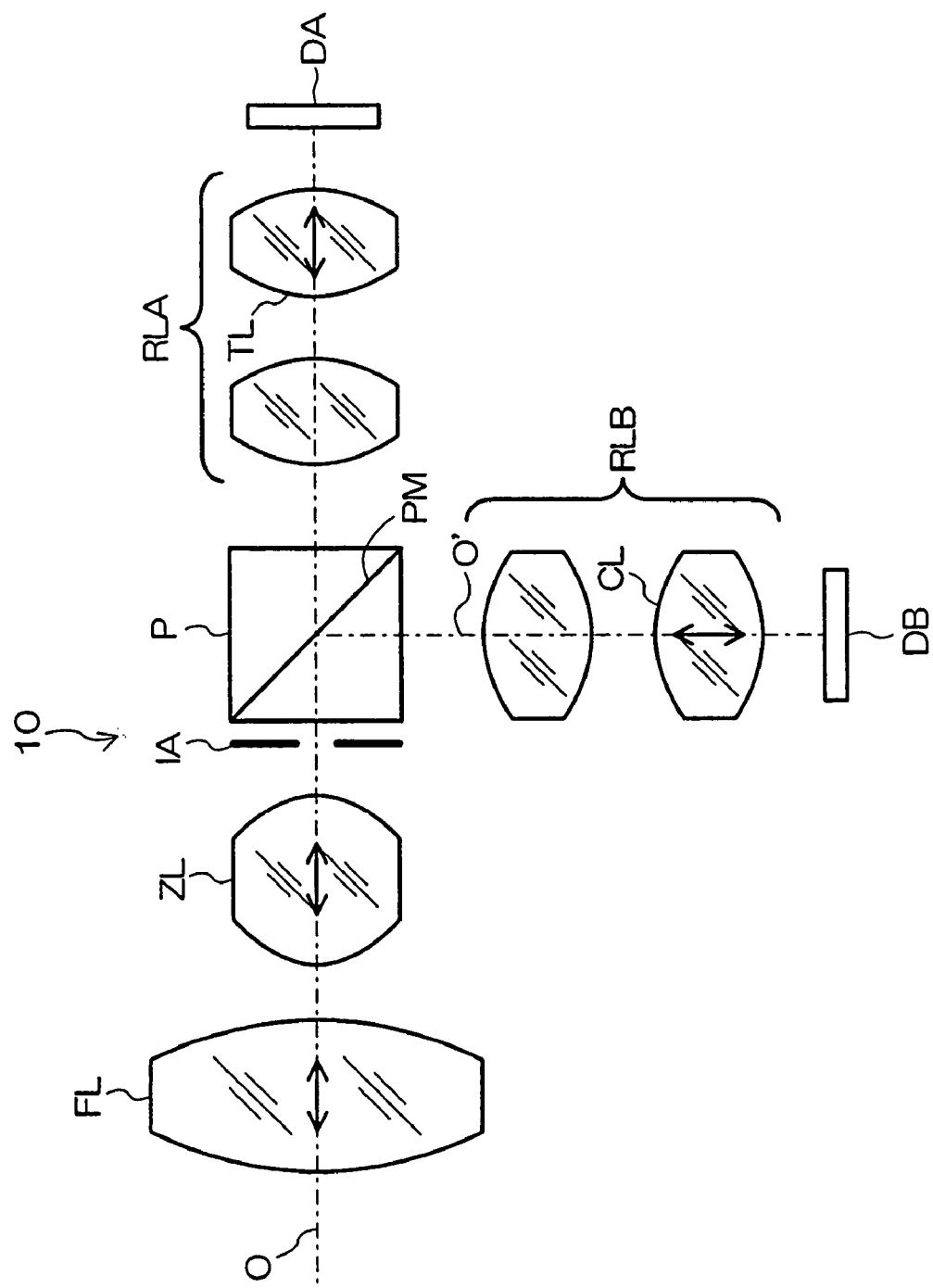
FIG. 7 is a view showing the configuration of another embodiment of the photographing lens.

Moreover, instead of the two irises IA and IB arranged as shown in FIG. 1 or 6, for example, the iris IA alone may be placed in front of the color separating prism P as shown in FIG. 7 (the same components as or components similar to those in FIG. 1 are denoted by the same reference numerals). In this case, instead of being controlled in accordance with an instruction signal outputted by the visible light camera main body 14 on the basis of the quality of object light in the visible light region, the iris IA may be controlled in accordance with an instruction signal outputted by the infrared light camera main body 16 on the basis of the quality of object light in the infrared light region. Alternatively, the iris IA may be controlled taking into account instruction signals outputted by both visible and infrared light camera main bodies 14 and 16 on the basis of the quality of object light in the infrared light region. Furthermore, even if only one iris is placed in the optical system, the quantity of object light in the visible light region (the level of a video signal obtained using the visible light camera main body 14) and the quantity of object light in the infrared light region (the level of a video signal obtained using the infrared light camera main body 16) can be individually controlled using the electronic shutters of the visible and infrared light camera main bodies 14 and 16 or controlling their gains.

What is claimed is:

1. A visible and infrared light photographing lens system which enables the same object to be photographed simultaneously using a visible light and an infrared light, the system comprising:

a focus lens which can be moved in a direction of an optical axis in order to focus on the object at a desired object distance;

a light dividing device which divides an object light having passed through said focus lens, into an object light for a visible light and an object light for an infrared light and which guides the object light for the visible light and the object light for the infrared light through a visible light optical path and an infrared light optical path, respectively;

a visible light image pickup device which picks up an object image of a visible light using the object light for the visible light;

an infrared light image pickup device which picks up an object image of an infrared light using the object light for the infrared light;

a compensation lens placed in at least one of the visible light optical path and the infrared light optical path so as to be movable in the direction of the optical axis, the compensation lens adjusting a position at which the object light passing through the compensation lens is formed into an image; and a compensation lens control device which determines an amount of compensation of a focusing position of infrared light on the basis of a position of an iris and position of the focus lens so that an object distance to the object at which said visible light image pickup device can be focused on the object is equal to an object distance to the object at which said infrared light image pickup device can be focused on the object.

2. The visible and infrared light photographing lens system according to claim 1, further comprising a zoom lens in front of said light dividing device, the zoom lens being movable in the direction of the optical axis in order to vary a zoom magnification, wherein said compensation lens control device controls the position of said compensation lens on the basis of a position of said focus lens and a position of said zoom lens.

3. The visible and infrared light photographing lens system according to claim 1, wherein said light dividing device is a dichloic mirror or a color separating prism, and a spectrum is obtained on the basis of wavelength regions by setting the object light for said visible light to be an object light in a visible light region and setting the object light for said infrared light to be an object light in an infrared light region.

4. The visible and infrared light photographing lens system according to claim 2, wherein said light dividing device is a dichloic mirror or a color separating prism, and a spectrum is obtained on the basis of wavelength regions by setting the object light for said visible light to be an object light in a visible light region and setting the object light for said infrared light to be an object light in an infrared light region.

5. The visible and infrared light photographing lens system according to claim 1, wherein an iris is placed in each of said visible light optical path and said infrared light optical path through which the object light for the visible light and the object light for the infrared light, respectively, into which the object light has been divided by the light dividing device, are guided.

6. The visible and infrared light photographing lens system according to claim 2, wherein an iris is placed in each of said visible light optical path and said infrared light optical path through which the object light for the visible light and the object light for the infrared light, respectively, into which the object light has been divided by the light dividing device, are guided.

7. The visible and infrared light photographing lens system according to claim 1, wherein an iris is placed in front of said light dividing device.

8. The visible and infrared light photographing lens system according to claim 2, wherein an iris is placed in front of said light dividing device.

9. The visible and infrared light photographing lens system according to claim 1, wherein the iris is placed in front of said light dividing device, and a light quantity adjusting device is placed in both or one of said visible light optical path and/or said infrared light optical path through which the object light for the visible light and/or the object light for the infrared light, respectively, into which the object light has been divided by the light dividing device, is/are guided.

10. The visible and infrared light photographing lens system according to claim 2, wherein the iris is placed in front of said light dividing device, and a light quantity adjusting device is placed in both or one of said visible light optical path and/or said infrared light optical path through which the object light for the visible light and/or the object light for the infrared light, respectively, into which the object light has been divided by the light dividing device, is/are guided.

* * * * *